Jan. 2, 1951     E. L. JOHNSON ET AL     2,536,289
PHOTOGRAPHIC COPYING APPARATUS
Filed July 21, 1949     4 Sheets-Sheet 1
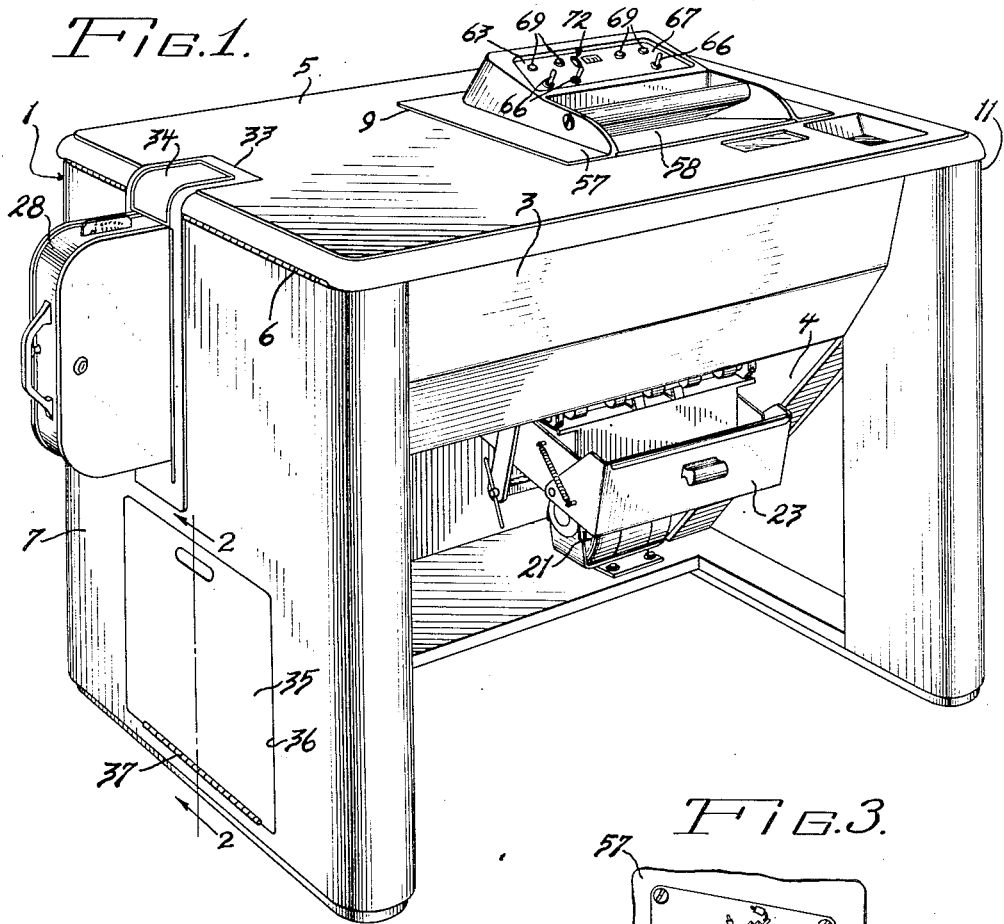
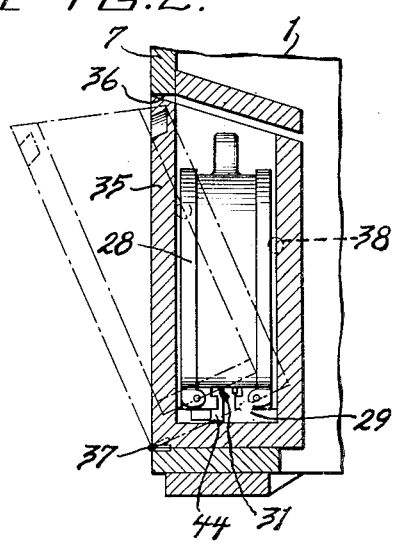
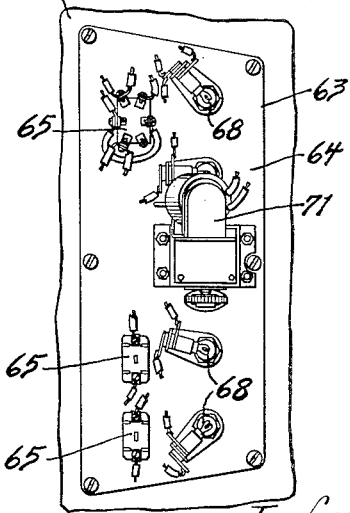
Inventors:
Elmer L. Johnson
Hugo Sollner
By Robert F. Miehle, Jr.
Attorney Jan. 2, 1951  E. L. JOHNSON ET AL  2,536,289
PHOTOGRAPHIC COPYING APPARATUS
Filed July 21, 1949  4 Sheets-Sheet 2
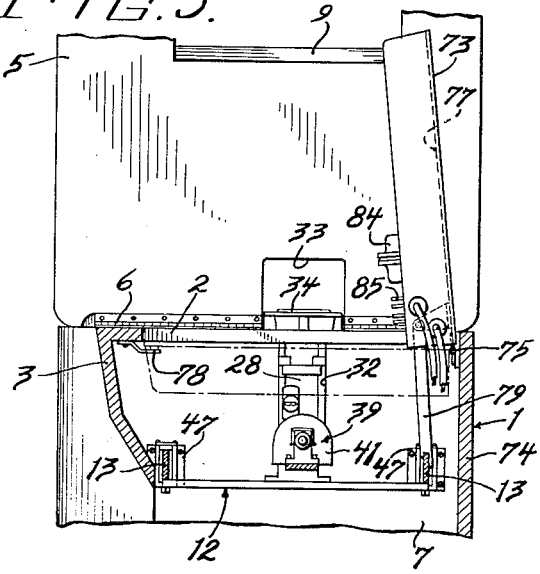
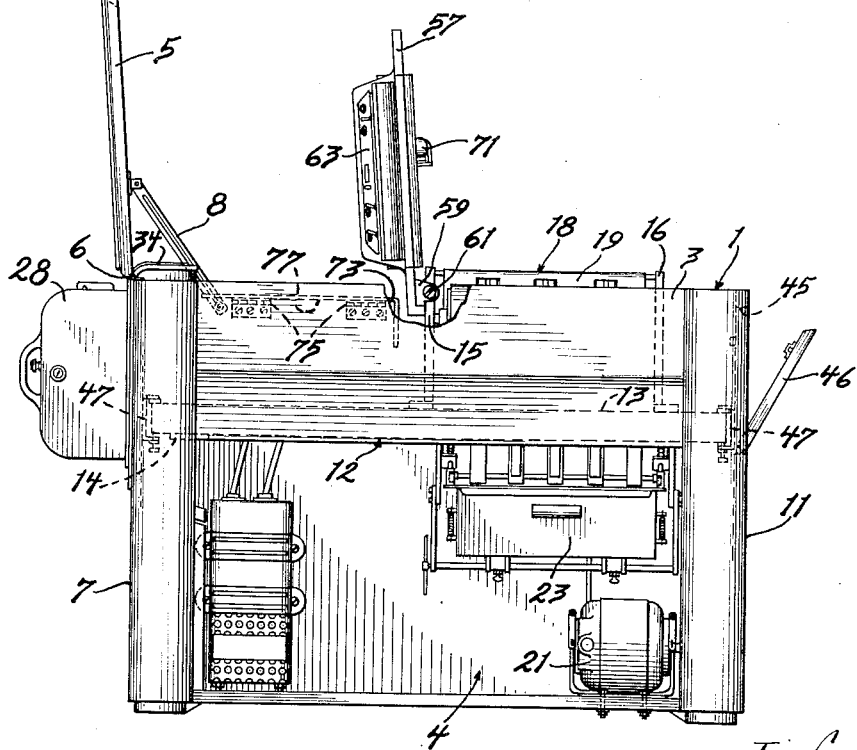
Inventors:
Elmer L. Johnson
Hugo Sollner
By Robert F. Miehle Jr.
Attorney

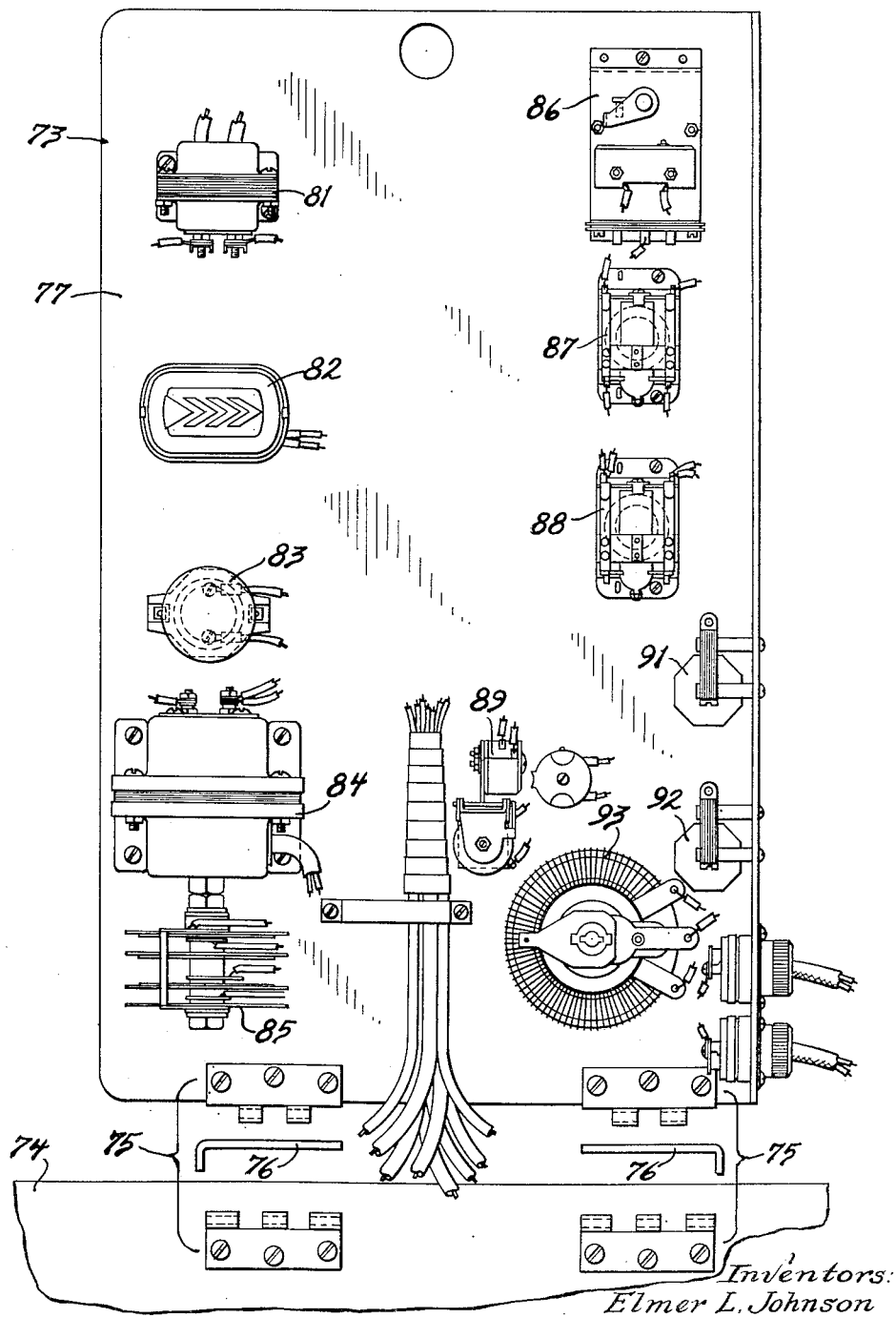

Jan. 2, 1951  E. L. JOHNSON ET AL  2,536,289
PHOTOGRAPHIC COPYING APPARATUS
Filed July 21, 1949  4 Sheets-Sheet 4
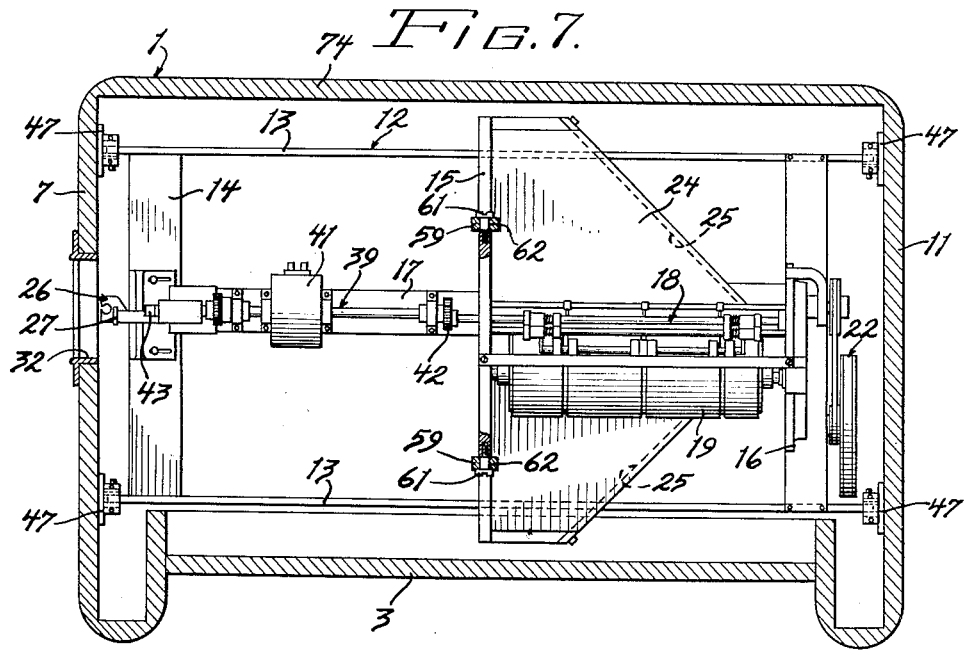
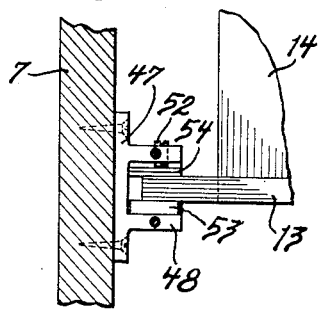
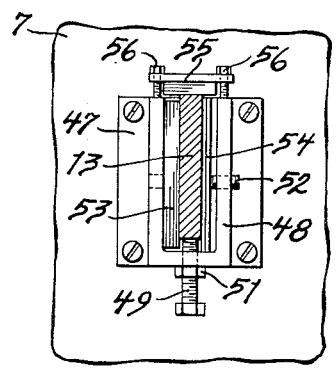
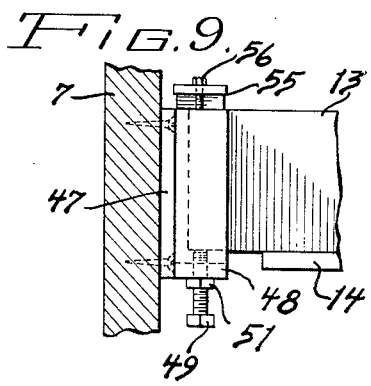
Inventors:
Elmer L. Johnson
Hugo Sollner
By Robert F. Miehle, Jr.
Attorney Patented Jan. 2, 1951

2,536,289

UNITED STATES PATENT OFFICE 2,536,289

PHOTOGRAPHIC COPYING APPARATUS

Elmer L. Johnson and Hugo Sollner, Chicago, Ill., assignors to Bell & Howell Company, Chicago, Ill., a corporation of Illinois Application July 21, 1949, Serial No. 106,052

8 Claims. (Cl. 88—24)

The present arrangement relates particularly to the general arrangement of micro-recording apparatus in which sheets or documents are fed in succession through the photographic field of a camera, and a sensitized strip in the camera is fed in correspondence with the fed sheets for successively photographing the sheets.

Objects of the invention reside in the provision of a novel, desirable and practical arrangement of photographic copying apparatus, which provides for convenience of operation, which provides for convenience and ease of assembly, and which provides for convenience and ease of servicing.

The invention will be better understood by reference to the accompanying drawing forming a part hereof and in which—

Figure 1 is perspective view of a photographic copying apparatus in the form of a micro-recorder embodying my invention;

Figure 2 is a partial section taken substantially on the line 2—2 of Figure 1;

Figure 3 is a view of the underside of the control panel of the apparatus, hereinafter described;

Figure 4 is front elevation of the apparatus showing parts of the same in position providing access to portions of the apparatus;

Figure 5 is a partial transverse sectional view of the apparatus showing parts of the same in position providing access to portions of the apparatus;

Figure 6 is a view of the underside of the electric device support plate of the apparatus showing the support plate in vertical access providing position relative to a portion of the cabinet and showing it detached from the cabinet, as hereinafter described;

Figure 7 is a horizontal sectional view of the apparatus taken in a plane immediately below the top thereof and having parts removed therefrom; and Figures 8, 9 and 10 are partial sectional views one of the mounts for the frame of the apparatus and taken respectively in a horizontal plane, in a vertical plane extending longitudinally of the apparatus, and in a vertical plane extending transversely of the apparatus.

Referring to the drawing, a horizontally elongated rectangular cabinet 1 is open at its top, as designated at 2, see Figures 1, 4, 5 and 7, for access thereinto, and is also open at the lower portion of its front side 3, as designated at 4, for access into the lower portion of the cabinet, the front of the cabinet being one of the long sides thereof. An elongated rectangular top member 5 normally closes the cabinet top, as shown in Figure 1, and is pivotally mounted on a horizontal axis, as designated at 6, at one short side thereof on and at one short side 7 of the cabinet for movement from a normal horizontal position closing the cabinet top to an upwardly extending position, as shown in Figures 4 and 5 to provide access into the cabinet from the top thereof, a slide link retainer device 8, see Figure 4, being connected with the cabinet and top member and serving to retain the top member in its upwardly extending position. The top member 5 is provided with a rectangular opening 9 therethrough in the region of the other short side thereof, this opening being in the region of the other short side 11 of the cabinet when the top member is in its normal horizontal position closing the top of the cabinet.

An elongated frame, generally designated at 12, extends longitudinally of and within the cabinet and comprises, see particularly Figure 7, longitudinal horizontally spaced parallel side frame members 13, transverse frame members 14, 15 and 16 spaced along and extending across between the side frame members and secured therewith and a center longitudinal frame member 17 extending between and secured with the frame members 14 and 15. The frame 12 is detachably mounted within the cabinet on the short sides 7 and 11 thereof, in a manner hereinafter described, and when the frame is so mounted, the side frame members 13, the center longitudinal frame member 17, and the transverse frame member 14 are disposed some distance below the top of the cabinet as shown in Figures 4 and 5.

A sheet feeding mechanism, generally designated at 18 and unnecessary to be described in detail, see Figures 4 and 7, is disposed within the cabinet in the region of the short side 11 of the cabinet and below the opening of the top member 5 when the top member is in horizontal position closing the cabinet top, and is mounted on and extends between the transverse frame members 15 and 16 of the frame 12, which frame members extend upwardly from the side frame members 13 of the frame, the sheet feeding mechanism being inclusive of a horizontal rotatable feed drum 19 at the top thereof and disposed on an axis extending longitudinally of the cabinet.

The sheet feeding mechanism 18 including the feed drum 19 is driven from a motor 21, see Figure 4, mounted downwardly within the cabinet 1 adjacent the short side 11 thereof, by a transmission which inclusive of a belt and pulley transmission 22, see Figure 7, also within the cabinet adjacent the short side 11 thereof, and assuming the sheet feeding mechanism to be driven, sheets fed in succession to the feed drum are fed vertically downwardly past a photographic field, not shown, and are thereafter delivered into a hopper 23, see Figures 1 and 4, within the cabinet 1 below the sheet feeding mechanism and suitably mounted on the frame 12.

A horizontal light enclosure 24, see Figure 7, is carried on the frame 12 at the level of the photographic field aforesaid, and is provided with a pair of opposed converging reflectors 25 arranged in a horizontal plane and transversely of the vertical sheet path and obliquely to and on opposite sides of the photographic field for reflecting images of opposite faces of the fed sheets as they pass the photographic field toward the short side 7 of the cabinet.

The end of the frame 12 adjacent the short side 7 of the cabinet is provided with a camera mount 26 which is inclusive of a vertical tongue 27. A camera 28 is provided with a mount 29, see Figure 2, which is inclusive of an undercut groove 31 detachably engageable, with vertical movement of the camera, with the tongue 27 of the camera mount 26 for mounting the camera on the apparatus as shown in Figures 1 and 4.

When so mounted the camera projects from the short side 7 of the cabinet, and this side is provided with a vertical opening 32 extending downwardly from the top of the cabinet, see Figure 7, to accommodate the camera. The top member 5 is provided with an opening 33 at the short side thereof corresponding with the short side 7 of the cabinet, see Figures 1 and 5, and this opening alines with the opening 32 to provide for removal and installation of the camera, a hinged cover member 34 normally closing the opening 33 and the portion of the opening 32 above the camera and being movable out of closing position for removal and installation of the camera.

A camera receptable 35 is arranged in an opening 36 in the short side 7 of the cabinet, see Figures 1 and 2, and being open at its top is hinged at its lower end on the short side 7, as designated at 37, for tilting movement from a closed position, shown in full lines in Figure 2, to an outwardly tilted position, shown in dot and dash lines in Figure 2, for the insertion of the camera into the receptacle when the copying apparatus is not in use and for the removal of the camera therefrom, a stop pin 38 on the receptacle engaging the inside of the short side 7 to limit outward tilting movement of the receptacle.

When the camera is mounted on the apparatus, as shown in Figures 1 and 4, images of both faces of the fed sheets as they pass the photographic field aforesaid are reflected by the reflectors 25 to the objective, not shown, of the camera and are photographed on a light sensitive strip, not shown, in the camera, the sheets being illuminated by means unnecessary to be described as they pass the photographed field. The camera is of the flow type and is inclusive of a usual strip feeding mechanism, not shown, for feeding the sensitized strip past the exposure aperture of the camera during the photographing of the sheets fed by the sheet feeding mechanism 18.

A camera drive transmission, generally designated at 39 and inclusive of an electromagnetic clutch 41, extends along and is mounted on the center longitudinal frame member 17 of the frame 12, and is driven from the sheet feeding mechanism 18 as designated at 42, so that the transmission 39 is driven from the motor 21 which drives the sheet feeding mechanism. The end of the transmission 39 which is adjacent the short side 7 of the cabinet is provided with a toothed clutch member 43. The camera 28 is provided with a toothed clutch member 44, see Figure 2, which is connected with the strip feeding means of the camera for driving the same, and when the camera is mounted on the apparatus, as shown in Figures 1 and 4, the clutch elements 43 and 44 are engaged so that the sensitized strip is fed under the control of the electromagnetic clutch 41 in synchronism with sheets fed by the sheet feeding mechanism 18 for photographing the sheets, the camera clutch member 44 being axially retractable out of engaging relation with the clutch member 43 for installation and removal of the camera. The electromagnetic clutch 41 is under the control of sheets fed by the sheet feeding mechanism 18 in a manner unnecessary to be described so that the sensitized strip in the camera is fed only while sheets are being photographed.

The photographic copying apparatus within the cabinet, comprising the frame 12, the sheet feeding mechanism 18, the light enclosure 24 and reflectors 25, the camera drive transmission 39 and the sheet receiving hopper 23, is removable from and installable in the cabinet 1 through the top opening 2 as a unit, thus facilitating assembly and servicing thereof. During such removal and installation, the belt of the belt and pulley transmission 12 is not engaged on one of the pulleys of this transmission, and to facilitate engagement and disengagement the belt with the pulley, the short side 11 of the cabinet is provided with an access opening 45, see Figure 4, which is normally closed by a door 46 as shown in Figure 4.

Two horizontally spaced brackets 47 are mounted on the inside of each of the short sides 7 and 11 of the cabinet in downwardly spaced relation with the top of the cabinet, see Figure 7, and the ends of the side frame members 13 of the frame 12 are engaged downwardly in upright U-shaped formations 48 of the brackets. Vertical support screws 49, see Figures 9 and 10, are screwthreaded through the bottom walls of the formations 48 and engage upwardly against the ends of the frame members 13 for supporting the frame, adjustment of the screws 49 serving for leveling the frame and they being secured in adjusted position by lock nuts 51. Set screws 52 screwthreaded through vertical walls of the formations 48 serve to clamp the frame members 13 and shims 53 and 54 between them and the opposite walls of the formations 48 to horizontally secure the frame 12, and the frame members are clamped downwardly on the support screws 49 by clamp blocks 55 clamped downwardly on the frame members 13 by vertical screws 56 screwthreaded downwardly into the side walls of the formations 48.

A feed chute member 57 is arranged above the sheet feeding mechanism 18 and has a normal horizontal position, see Figure 1, occupying the opening 9 of the top member 5 when the top member is in its normal horizontal position closing the top of the cabinet, and the chute member is provided with a feed chute 58 through which sheets are successively fed to the feed drum 19 of the sheet feeding mechanism 18 for the feeding thereof by the sheet feeding mechanism as previously described. The feed chute member is pivotally mounted on the top portion of the intermediate transverse frame member 15 and on a horizontal axis disposed transversely of the cabinet for movement from its normal horizontal position to an upwardly extending position, as shown in Figure 4, to provide access to the sheet feeding mechanism. The pivotal mounting of the chute member comprises, see Figures 4 and 7, spaced ears 59 on the feed chute and screw studs 61 respectively engaged for rotation in alined bores 62 through the ears 59 and screw-threaded into the frame member 15, it being observed that removal of the screw studs 61 from the ears 59 provide for removal of the chute member from and installation of the same on the frame 12 for convenience in assembly and servicing.

The chute member 57 is provided with a control panel 63, see Figures 1, 3 and 4, arranged thereon so that the lower face 64 of the panel faces inwardly of the cabinet when the chute member is in its normal horizontal positon. Various electrical devices, cooperative with the copying apparatus are mounted on the control panel at the lower face thereof and, see Figure 3, comprise control switches 65 having operating levers 66 projecting above the upper face 67 of the control panel for manual actuation, indicating lamps 68 observable through windows 69 through the panel, and an electromagnetically operated sheet counter 71 observable and manually settable from the upper face of the control panel as indicated at 72. Thus, the electrical devices which are mounted on the control panel are concealed and protected when the chute member is in its normal horizontal position, and are accessible for servicing when the chute member is in its upper position.

A support plate 73 has a normal horizontal position spaced above the frame 12 and the camera drive transmission 39 of the copying apparatus and adjacently spaced below the top member 5 when the top member is in its normal horizontal position, see Figures 1, 4, 5 and 6, and the support panel is pivotally mounted for movement on a horizontal axis in the region of and parallel to the long side 74 of the cabinet forming the rear and adjoining the short side 7 thereof, by means of hinges 75 including removable hinge pins 76, as shown in Figure 6, providing for convenient installation and removal of the support plate. As so pivotally mounted the support plate is movable from its normal horizontal position, as shown in Figure 4 and in dot and dash lines in Figure 5, to an upwardly extending position, shown in full lines in Figure 5, in which the copying apparatus, particularly the camera drive transmission 39, is accessible and the face 77 of the support plate, which faces downwardly when the support plate is in its normal horizontal position, is accessible.

The normal horizontal position of the support plate 73 is established by the free end thereof engaging downwardly on a stop 78 on the front of the cabinet, see Figure 5, and the support plate 73 is releasably maintained in its upwardly extending position by a strut link 79 pivoted on the support plate and engageable downwardly on the adjacent frame member 13 of the frame 12.

Various electrical devices, cooperative with the copying apparatus, are mounted on the face 77 of the support plate 73 and, see Figure 6, comprise a transformer 81, an alarm buzzer 82, a fuse 83, a transformer 84, a rectifier 85, an electrical interval timer 86, electromagnetic relays 87, 88, 89, 91 and 92, and a rheostat 93. As so mounted on the face 77 of the support plate 73, these electrical devices are concealed and protected when the support plate is in its normal horizontal position and are accessible for servicing when the support plate is in its upwardly extending position.

While we have thus described our invention, we do not wish to be limited to the precise details described, as changes may be readily made without departing from the spirit of our invention, but having thus described our invention, we claim as new and desire to secure by Letters Patent the following:

1. In a photographic copying apparatus, the combination of a rectangular cabinet open at its top, a rectangular top member normally closing said cabinet top and pivotally mounted on a horizontal axis at one side thereof on and at a side of said cabinet for movement from a normal horizontal position closing said cabinet top to an upwardly extending position to provide access into said cabinet, photographic copying apparatus within said cabinet, a support plate normally within said cabinet and having a normal horizontal position spaced above said copying apparatus and adjacently spaced below said top member when said top member is in its said normal position and pivotally mounted for movement on a horizontal axis in the region of and parallel to a side of said cabinet adjoining said first mentioned side of said cabinet from said normal horizontal position thereof to an upwardly extending position to provide access to said copying apparatus and access to the face of said support plate which faces downwardly when said support plate is in said normal position thereof, and electrical devices cooperative with said copying apparatus and mounted on said support plate at said face thereof to be accessible when said support plate is in its upwardly extending position.

2. In a photographic copying apparatus, the combination of a cabinet open at its top, a top member normally closing said cabinet top and movable from a normal horizontal position closing said cabinet top to provide access into said cabinet and provided with an opening therethrough, photographic copying apparatus within said cabinet comprising sheet feeding mechanism disposed below said opening of said top member when said top member is in said normal position thereof, a feed chute member above said feeding mechanism for feeding sheets thereto and having a normal horizontal position occupying said opening of said top member when said top member is in its said normal position and pivotally mounted for movement from said normal position thereof to an upwardly extending position to provide access to said sheet feeding mechanism, a support member normally within said cabinet and horizontally displaced from said feed chute member and having a normal horizontal position between said copying apparatus and said top member when said top member is in its said normal position and mounted for movement from said normal horizontal position thereof to another position to provide access to said copying apparatus, and electrical devices cooperative with said copying apparatus and mounted on said support member to be accessible when said support member is in said other position thereof.

3. In a photographic copying apparatus, the combination of a cabinet open at its top, a top member normally closing said cabinet top and movable from a normal horizontal position closing said cabinet top to provide access into said cabinet and provided with an opening therethrough, photographic copying apparatus within said cabinet and comprising a frame detachably mounted on said cabinet and sheet feeding mechanism mounted on said frame and disposed below said opening of said top member when said top member is in said normal position thereof, a feed chute member above said feeding mechanism for feeding sheets thereto and having a normal horizontal position occupying said opening of said top member when said top member is in its normal position and pivotally mounted on said frame on a horizontal axis for movement from said normal position thereof to an upwardly extending position to provide access to said sheet feeding mechanism, and said copying apparatus as a unit being removable from and installable in said cabinet through the open top thereof, a support plate normally within said cabinet and horizontally displaced from said feed chute member and having a normal horizontal position spaced above said copying apparatus and adjacently spaced below said top member when said top member is in its said normal position and pivotally mounted for movement on a horizontal axis in the region of and parallel to one side of said cabinet from said normal horizontal position thereof to an upwardly extending position to provide access to said copying apparatus and access to the face of said plate which faces downwardly when said plate is in said normal position thereof, and electrical devices cooperative with said copying apparatus and mounted on said support plate at said face thereof to be accessible when said support plate is in its upwardly extending position.

4. In a photographic copying apparatus, the combination of a horizontally elongated rectangular cabinet open at its top, an elongated rectangular top member normally closing said cabinet top and pivotally mounted on a horizontal axis at one short side thereof on and at one short side of said cabinet for movement from a normal horizontal position closing said cabinet top to an upwardly extending position to provide access into said cabinet and provided with an opening therethrough in the region of the other short side thereof, photographic copying apparatus within said cabinet and comprising an elongated frame extending longitudinally of said cabinet and detachably mounted on the short sides thereof, and sheet feeding mechanism mounted on said frame and disposed in the region of the other short side of said cabinet below said opening of said top member when said top member is in said normal position thereof, a feed chute member above said feeding mechanism for feeding sheets thereto and having a normal horizontal position occupying said opening of said top member when said top member is in its said normal position and pivotally mounted on said frame on a horizontal axis for movement from said normal position thereof to an upwardly extending position to provide access to said sheet feeding mechanism, said copying apparatus as a unit being removable from and installable in said cabinet through the open top thereof, a support plate normally within said cabinet and disposed between said feed chute member and said first mentioned short side of said cabinet and having a normal horizontal position spaced above said copying apparatus and below said top member when said top member is in its said normal position and pivotally mounted for movement on a horizontal axis in the region of and parallel to one long side of said cabinet from said normal position thereof to an upwardly extending position to provide access to said copying apparatus and access to the face of said support plate which faces downwardly when said support plate is in said normal position thereof, and electrical devices cooperative with said copying apparatus and mounted on said support plate at said face thereof to be accessible when said support plate is in its upwardly extending position.

5. In a photographic copying apparatus, the combination of claim 2 and further comprising a control panel on said feed chute member and having one face thereof facing inwardly of said cabinet when said feed chute member is in said normal position thereof, and additional electrical devices cooperative with said copying apparatus and mounted on said control panel at said face thereof and accessible when said feed chute member is in said upwardly extending position.

6. In a photographic copying apparatus, the combination of claim 4 and further comprising a control panel on said feed chute member and having one face thereof facing inwardly of said cabinet when said feed chute member is in said normal position thereof, and additional electrical devices cooperative with said copying apparatus and mounted on said control panel at said face thereof and accessible when said feed chute member is in said upwardly extending position.

7. In a photographic copying apparatus, the combination of a cabinet open at its top, a top member normally closing said cabinet top and movable from a normal horizontal position closing said cabinet top to provide access into said cabinet and provided with an opening therethrough, photographic copying apparatus within said cabinet and comprising sheet feeding mechanism disposed below said opening of said top member when said top member is in said normal position thereof, a feed chute member above said feeding mechanism for feeding sheets thereto and having a normal horizontal position occupying said opening of said top member when said top member is in its said normal position and pivotally mounted for movement from said normal position thereof to an upwardly extending position to provide access to said sheet feeding mechanism, a control panel on said feed chute member and having one face thereof facing inwardly of said cabinet when said feed chute member is in said normal position thereof, and electrical devices cooperative with said copying apparatus and mounted on said control panel at said face thereof and accessible when said feed chute member is is said upwardly extending position.

8. In a photographic copying apparatus, the combination of a horizontally elongated rectangular cabinet open at its top, an elongated rectangular top member normally closing said cabinet top and pivotally mounted on a horizontal axis at one short side thereof on and at one short side of said cabinet for movement from a normal horizontal position closing said cabinet top to an upwardly extending position to provide access into said cabinet and provided with an opening therethrough in the region of the other short side thereof, photographic copying apparatus within said cabinet and comprising an elongated frame extending longitudinally of said cabinet and detachably mounted on the short sides thereof and sheet feeding mechanism mounted on said frame and disposed in the region of the other short side of said cabinet below said opening of said top member when said top member is in said normal position thereof, a feed chute member above said feeding mechanism for feeding sheets thereto and having a normal horizontal position occupying said opening of said top member when said top member is in its said normal position and pivotally mounted on said frame on a horizontal axis for movement from said normal position thereof to an upwardly extending position to provide access to said sheet feeding mechanism, said copying apparatus being removable from and installable in said cabinet through the top opening thereof as a unit, a control panel on said feed chute member and having one face thereof facing inwardly of said cabinet when said feed chute member is in said normal position thereof, and electrical devices cooperative with said copying apparatus and mounted on said control panel at said face thereof and accessible when said feed chute member is in said upwardly extending position.

ELMER L. JOHNSON.
HUGO SOLLNER.

REFERENCES CITED

The following references are of record in the file of this patent:

UNITED STATES PATENTS

| Number | Name | Date |
|---|---|---|
| 2,121,061 | Townsend | June 21, 1938 |
| 2,210,472 | Strotmann | Aug. 6, 1940 |
| 2,312,472 | Oiler | Mar. 2, 1943 |